(12) United States Patent

Chen

(10) Patent No.: US 12,632,499 B2

(45) Date of Patent: May 19, 2026

(54) SYSTEMS AND METHODS FOR USING GRAPH DATA STRUCTURES

(71) Applicant: ROYAL BANK OF CANADA, Toronto (CA)

(72) Inventor: Jason Xiao Han Chen, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 18/891,359

(22) Filed: Sep. 20, 2024

(65) Prior Publication Data

US 2025/0094494 A1 Mar. 20, 2025

Related U.S. Application Data

(60) Provisional application No. 63/539,460, filed on Sep. 20, 2023.

(51) Int. Cl.
*G06F 16/901* (2019.01)
*G06F 16/23* (2019.01)
*G06F 16/2453* (2019.01)

(52) U.S. Cl.
CPC ...... *G06F 16/9024* (2019.01); *G06F 16/2386* (2019.01); *G06F 16/2453* (2019.01)

(58) Field of Classification Search
None
See application file for complete search history.

(56) References Cited

U.S. PATENT DOCUMENTS

| | | | | |
|---|---|---|---|---|
| 11,449,511 B1* | 9/2022 | Townsend | ............. | G06F 16/904 |
| 11,775,526 B1* | 10/2023 | Townsend | ............. | G06F 16/904 |
| | | | | 707/769 |
| 2019/0073388 A1* | 3/2019 | Desmarets | ............ | G06F 16/213 |
| 2019/0220546 A1* | 7/2019 | Cohen | ................. | G06F 16/9024 |
| 2021/0344649 A1* | 11/2021 | O'Mahony | ......... | H04L 63/0263 |
| 2022/0050844 A1* | 2/2022 | Leau | ...................... | G06F 16/244 |

OTHER PUBLICATIONS

Stackoverflow post entitled "Redis mget showing in Slowlog", 3 Pages, answer posted on Feb. 13, 2018 by user "Not_a_Golfer" on p. 2. Retrieved from the internet: <https://stackoverflow.com/ questions/48762318/redis-mget-showing-in-slowlog> (Year: 2018).*

* cited by examiner

*Primary Examiner* — Giuseppi Giuliani

(74) *Attorney, Agent, or Firm* — Norton Rose Fulbright Canada LLP

(57) ABSTRACT

An approach and corresponding computer system adapted for combining relational and non-relational data storage and indexing techniques is proposed. The approach utilizes graph data structures that are specifically configured for supporting performance improvements in relational querying while maintaining the advantages from a non-relational database. The graph data structures can be used for graph traversals and graph operations, among others, which can improve an overall computational complexity level associated with various operations at the cost of storage.

18 Claims, 6 Drawing Sheets

300

400

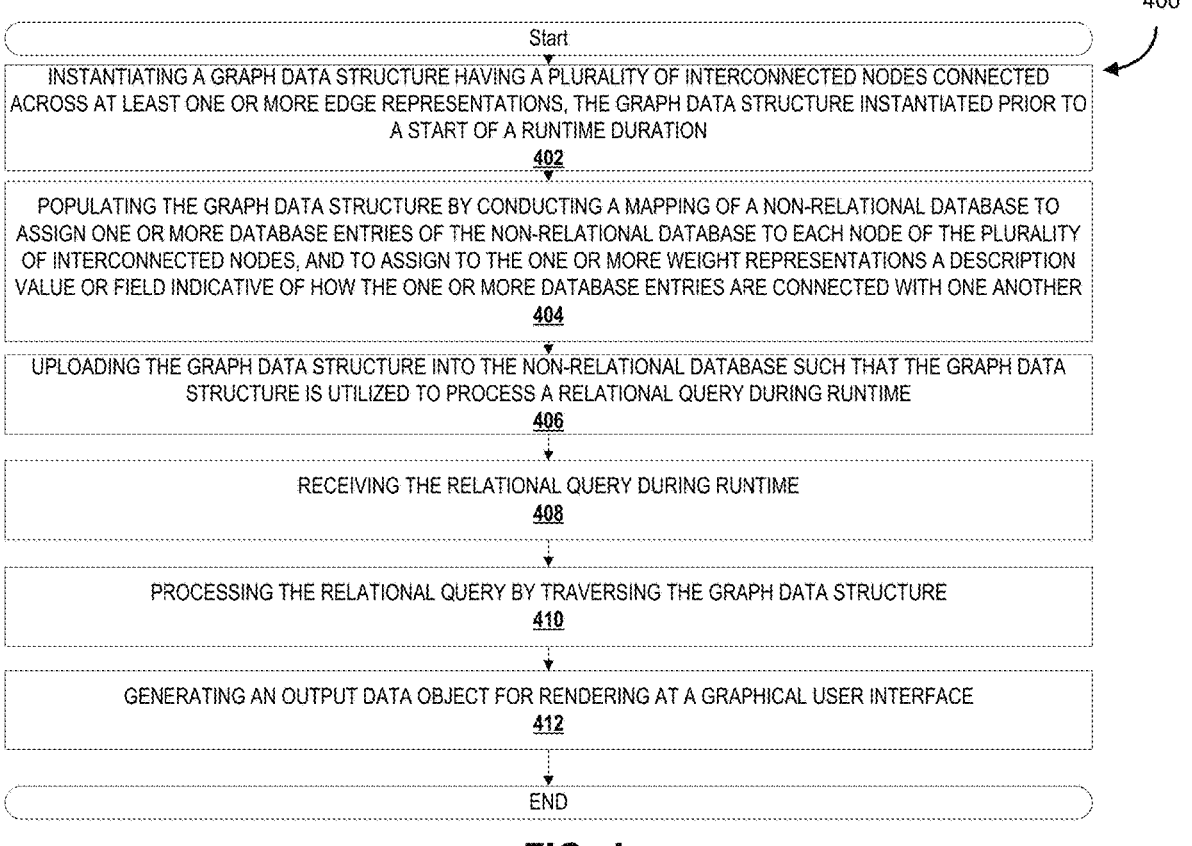

Start

INSTANTIATING A GRAPH DATA STRUCTURE HAVING A PLURALITY OF INTERCONNECTED NODES CONNECTED ACROSS AT LEAST ONE OR MORE EDGE REPRESENTATIONS, THE GRAPH DATA STRUCTURE INSTANTIATED PRIOR TO A START OF A RUNTIME DURATION
402

POPULATING THE GRAPH DATA STRUCTURE BY CONDUCTING A MAPPING OF A NON-RELATIONAL DATABASE TO ASSIGN ONE OR MORE DATABASE ENTRIES OF THE NON-RELATIONAL DATABASE TO EACH NODE OF THE PLURALITY OF INTERCONNECTED NODES, AND TO ASSIGN TO THE ONE OR MORE WEIGHT REPRESENTATIONS A DESCRIPTION VALUE OR FIELD INDICATIVE OF HOW THE ONE OR MORE DATABASE ENTRIES ARE CONNECTED WITH ONE ANOTHER
404

UPLOADING THE GRAPH DATA STRUCTURE INTO THE NON-RELATIONAL DATABASE SUCH THAT THE GRAPH DATA STRUCTURE IS UTILIZED TO PROCESS A RELATIONAL QUERY DURING RUNTIME
406

RECEIVING THE RELATIONAL QUERY DURING RUNTIME
408

PROCESSING THE RELATIONAL QUERY BY TRAVERSING THE GRAPH DATA STRUCTURE
410

GENERATING AN OUTPUT DATA OBJECT FOR RENDERING AT A GRAPHICAL USER INTERFACE
412

END

SYSTEMS AND METHODS FOR USING GRAPH DATA STRUCTURES

CROSS-REFERENCE TO RELATED APPLICATIONS

This claims the benefit of and priority to U.S. Provisional Patent Application No. 63/539,460, filed Sep. 20, 2023, the entire contents of which are incorporated herein by reference.

FIELD

This relates to the field of data storage, and more specifically, to devices, systems and methods for storage and retrieval of large-scale data.

BACKGROUND

Working with large scale technology infrastructure is especially challenging with complex computing infrastructures. For example, complex computing infrastructures may utilize monitoring sub-processes to generate alerts and conduct other automated processing tasks, and it may be computationally challenging to traverse data sets while also providing a satisfactory response time, due to practical processing constraints.

Various database approaches and techniques have been developed for use with certain forms of data storage and retrieval. However, currently-used approaches typically involve trade-offs in response time between various retrieval strategies and the corresponding functionality enabled by these strategies.

Batch processing techniques can be used to asynchronously process long-running queries over large, non-relational datasets. For certain queries that do not rely on the relations between data elements, non-relational data storage techniques can offer important advantages in terms of insertion speed and scalability, at the expense of reduced querying flexibility. Various databases optimized for non-relational querying (e.g., querying documents based on text fields) are often deployed where this reduced flexibility in querying is acceptable.

Conversely, relational storage techniques allow for flexible querying of data, but typically do not allow for rapid insertion and updating of data in bulk, which may be required by systems operating at scale. Other forms of non-relational data storage present challenges when searching based on relations between data elements, often resulting in these queries becoming prohibitively slow. This often results in serious limitations to the sorts of queries that can be sent to non-relational datasets in real-time or near real-time.

Moreover, implementing relational storage approaches can be a significant technical challenge when dealing with limited computing resources, computing time, and processing power.

SUMMARY

In accordance with one aspect, there is provided a computer implemented database system, the system comprising a computer processor configured to: receive one or more data sets for storage in a non-relational database, each of said data sets comprising data elements; instantiate, prior to a start of a runtime duration, a graph data structure having a plurality of interconnected nodes connected by at least one or more edges; prior to the start of the runtime duration, populate the graph data structure by performing a mapping of said non-relational database to assign one or more database entries of the non-relational database to each node of said plurality of interconnected nodes, and to assign to the one or more edges a description value or field indicating how the one or more database entries are related to each other; store the graph data structure e non-relational database; receive a relational query for said non-relational database; process said relational query based at least in part on said graph data structure; and return a result of said relational query.

In accordance with another aspect, there is provided a computer implemented method for improving performance of a database system, the method comprising: receiving one or more data sets for storage in said non-relational database, each of said data sets comprising data elements; instantiating, prior to a start of a run-time duration, a graph data structure having a plurality of interconnected nodes connected by at least one or more edges; prior to the start of the runtime duration, populating the graph data structure by performing a mapping of said non-relational database to assign one or more database entries of the non-relational database to each node of said plurality of interconnected nodes, and to assign to the one or more edges a description value or field indicating how the one or more database entries are related to each other; storing said graph data structure in said non-relational database; receiving a relational query for said non-relational database; processing said relational query based at least in part on said graph data structure; and returning a result of said relational query.

In accordance with still another aspect, there is provided a non-transitory computer readable storage medium having stored thereon processor-executable instructions that, when executed by one or more processors, cause the one or more processors to perform the method as described herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein:

FIG. 4 is a process diagram depicting an example computing method, in accordance with some embodiments;

DETAILED DESCRIPTION

Figure 1:
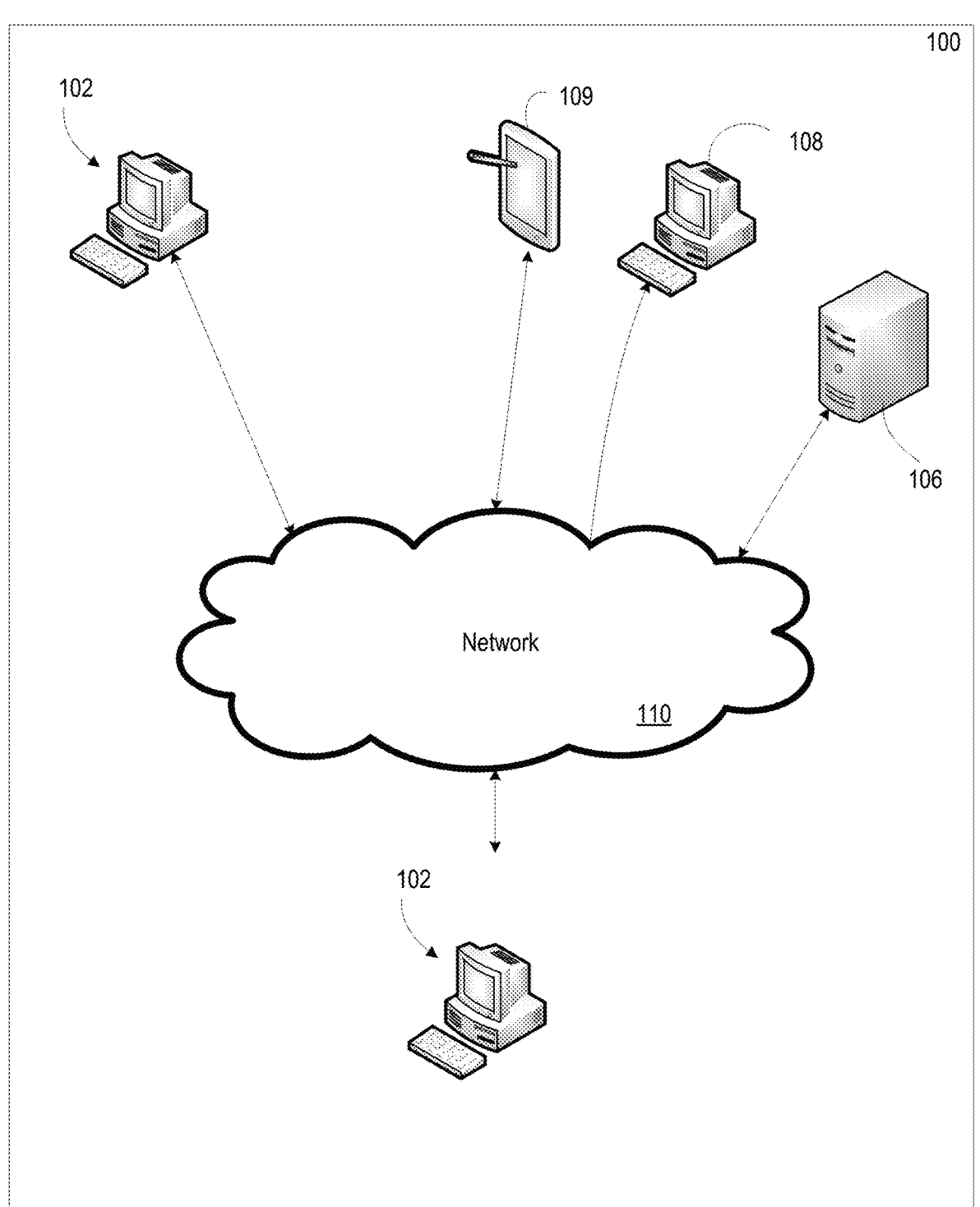
FIG. 1 is a depiction of an example computing system, in accordance with some embodiments.

Various embodiments described herein relate to improved approaches and corresponding computer system for data storage and retrieval. Some embodiments may relate to computer systems specially adapted to address specific technical problems that relate to conducting computationally efficient traversals for the generation of meaningful insights from the source data. In some embodiments, the computing system is adapted to combine the benefits of several different data storage and indexing techniques to facilitate the provision of both relational and non-relational queries with improved efficiency (in some cases, in near-real-time), while also providing improved data insertion and updating speeds. Some embodiments described herein may allow for a variety of different forms of querying, where each form of querying can make use of different data indexing techniques to enable near real-time performance.

Some embodiments relate to systems and methods which effectively combine the benefits of several different data storage techniques and strategies in order to provide both relational and non-relational database functionality. In some embodiments, relational and non-relational queries may be enabled to be performed in near-real-time, while also enabling improved data insertion and updating speeds. Some embodiments may allow for a variety of different forms of querying, where each form of querying may make use of different data storage techniques to enable improved performance. In some embodiments, by combining relational and non-relational data storage and indexing functionality, both relational and non-relational querying may be performed efficiently.

Some embodiments described herein include both non-relational and relational storage aspects, where functionality of each aspect is enabled through the use of the same storage primitives. That is, in some embodiments, relational storage techniques may be built on top of the existing non-relational primitives that are made available by an underlying non-relational database (e.g., elasticsearch), rather than being built directly on top of the low-level mechanisms on the physical hardware.

In some embodiments, by building the relational components of a database in this manner, instead of on top of the low-level elements of the database, the development of those relational aspects may be greatly simplified. Moreover, by appropriately leveraging the existing non-relational features of the database, it may be possible to preserve similar time complexity for various operations as would be possible if these secondary features were instead developed based on lower-level mechanisms.

In some embodiments, the effect of this combination may enable flexible querying of the underlying datasets, based on either relational or non-relational aspects, in a single database (including databases consisting of multiple disparate shards), and at near-real-time speed. In applications requiring near-real-time querying of data, this may offer important advantages in allowing for greater flexibility of operation.

These advantages may be compounded when databases are implemented in the form of multiple shards. In such embodiments, disparate database components may be updated via asynchronous batch processes, and systems and methods described herein may enable indexing and other supplemental data processes associated with secondary data storage techniques to be kept up to date as changes are made, without requiring the updating operations to block insertion operations. This may be important in contexts where the speed of insertion for a non-relational database is an important consideration.

Various embodiments of the present invention may make use of interconnected computer networks and components. FIG. 1 is a block diagram depicting components of an example computing system 100. Components of the computing system are interconnected to define a database enrichment system. As used herein, the term "database enrichment system" refers to a combination of hardware devices configured under control of software and interconnections between such devices and software.

As depicted, system 100 may include a variety of clients incorporating and/or incorporated into a variety of computing devices which may communicate with other computing devices 102 via one or more networks 110. For example, a client 102 may incorporate and/or be incorporated into client application implemented at least in part by one or more computing devices. Example computing devices may include, for example, at least one server 102 with a data storage 118 such as a hard drive, array of hard drives, network-accessible storage, or the like; at least one web server 106, and a plurality of client computing devices 108. Server 102, web server 106, and client computing devices 108 may be in communication by way of a network 110. More or fewer of each device are possible relative to the example configuration depicted in FIG. 1.

Network 110 may include one or more local-area networks or wide-area networks, such as IPv4, IPv6, X.25, IPX compliant, or similar networks, including one or more wired or wireless access points. The networks may include one or more local-area networks (LANs) or wide-area networks (WANs), such as the internet. In some embodiments, the networks are connected with other communications networks, such as GSM/GPRS/3G/4G/LTE/5G networks.

Figure 2:
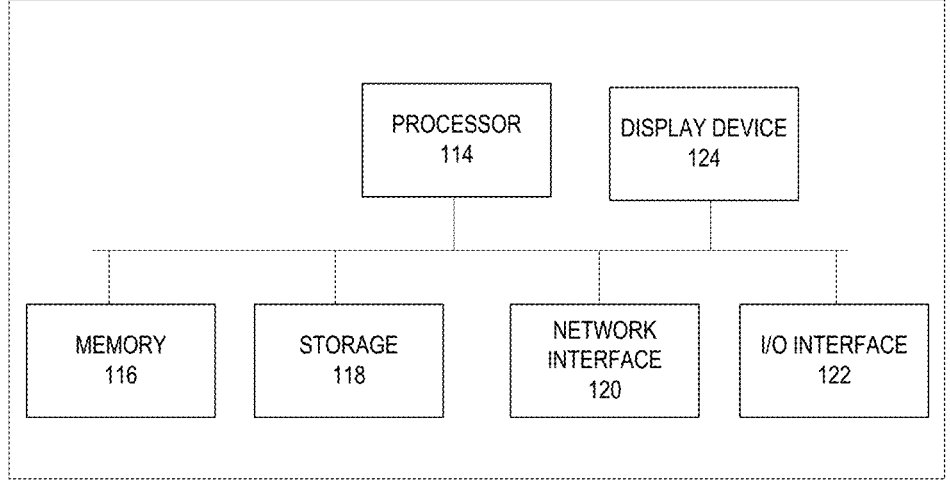
FIG. 2 is a block diagram depicting components of an example computing device, in accordance with some embodiments.

FIG. 2 is a block diagram depicting components of an example computing device, such as a desktop computing device 102, client computing device 108, tablet 109, mobile computing device, and the like. As depicted, an example computing device may include a processor 114, memory 116, persistent storage 118, network interface 120, and input/output interface 122.

Processor 114 may be an Intel or AMD x86 or x64, PowerPC, ARM processor, or the like. Processor 114 may operate under the control of software loaded in memory 116. Network interface 120 connects the computing device to network 110. Network interface 120 may support domain-specific networking protocols for certain peripherals or hardware elements. I/O interface 122 connects the computing device to one or more storage devices and peripherals such as keyboards, mice, pointing devices, USB devices, disc drives, display devices 124, and the like.

In some embodiments, I/O interface 122 may connect various hardware and software devices used in connection with the systems and methods described herein to processor 114 and/or to other computing devices. In some embodiments, I/O interface 122 may be compatible with protocols such as WiFi, Bluetooth, and other communication protocols.

Software may be loaded onto one or more computing devices. Such software may be executed using processor 114. The software may include an operating system and application software, such as a database enrichment system 126. It will be appreciated that in some computing environments, such as distributed computing environments, implementation, and administration of a service such as system 126 may be distributed amongst a plurality of separate computing devices.

In some embodiments, database enrichment system 126 may be configured to provide an improved approach to data storage and retrieval, and particularly to expanding the functionality of non-relational databases. Some embodiments may including computing systems, such as system 126, which are specially adapted to address specific technical problems that relate to conducting computationally efficient traversals for the generation of meaningful insights from the data stored in a non-relational database. In some embodiments, the computing system is adapted to combine the benefits of several different data storage and indexing techniques to facilitate the provision of both relational and non-relational database functionality (e.g., queries) with improved efficiency, while also improving data insertion and updating speeds. Some embodiments described herein may allow for a variety of different forms of querying, wherein each form of querying can make use of different data indexing techniques to enable improved.

Some embodiments of the computer system may be implemented in the form of a computer server that operates in conjunction with computing middleware and infrastructure (e.g., within an enterprise level data center or a distributed computing architecture where a number of interconnected computing devices operate together to provide one or more enterprise level computing services).

In some embodiments, computing systems may include both non-relational and relational storage and indexing techniques, where techniques can be combined to allow for particular forms of querying which are built on top of storage primitives. By using the same set of storage primitives, the design complexity of some embodiments may be reduced, thereby enabling faster development and better overall system reliability.

In some embodiments, a graph data structure may be established that operates as a layer over a document data store that can then be used to create meaningful relational insights. In some embodiments, these insights can be used as an input into a graphical user interface (GUI) having interactive controllable display elements which can be operated by a user. In some embodiments, the graph data structure can be accessed and/or otherwise utilized through an application programming interface (API). The GUI may provide an administrative user with a "single pane of glass" to view data that otherwise would take much longer to aggregate, retrieve and visualize. The GUI may operate in concert with a backend to conduct aggregation and retrieval data processes that can be invoked to conduct aggregation and traversal functions. In some embodiments, aggregation and traversal functions may be callable functions such that a data insights generation system can call the functions to generate insights. In some embodiments, insight generation can be a portion of a larger, more integrated and more intricate data process whereby reports are generated for consumption by running data processes on the backend.

By combining several different data storage and indexing techniques into the same data storage system, and by matching each technique to a particularly suitable form of querying, the advantages of the various forms of data storage and indexing can be combined and/or leveraged to achieve improved functionality and performance. In settings requiring near-real-time querying of data, this may offer significant advantages in allowing for greater flexibility in operation.

Some embodiments described herein introduce a plurality of different data storage techniques, constructed using existing non-relational database primitives and components, thereby enhancing those existing database primitives and components with additional functionality, to enable alternative forms of querying that would otherwise be significantly more computationally intensive and time-consuming to execute.

Figure 3:
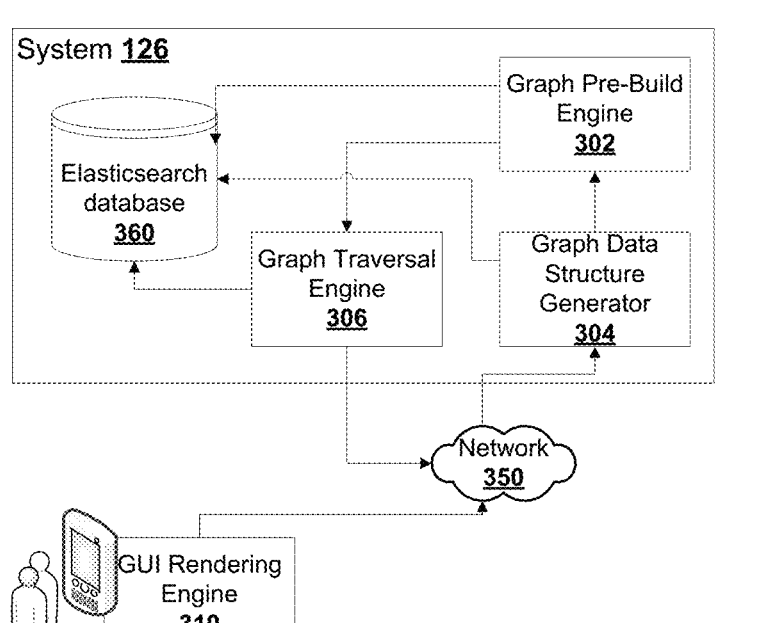
FIG. 3 is a computational system diagram, in accordance with some embodiments.

In some embodiments, data enrichment system 126 may be configured to interact with and supplement a database which is non-relational (such as, for example, an elasticsearch database 360 as depicted in FIG. 3). A non-relational database such as elasticsearch may be used in a database system for its superior search response times. However, the elasticsearch platform was not designed to work with relational data. The need to provide relational database functionality may present a challenge, particularly in terms of response time with existing non-relational databases.

For example, typically most data objects may be modelled into a single document which has nested parent/child relationships that can be used to build relationships. The use of graph data structures may be used to represent nested parent/child relationships. This sort of configuration is typically acceptable at a lower scale of data (such as primitive relationships), but performance costs increase exponentially when querying higher orders of separation (e.g., parent/grandchild, parent/great-grandchild, or the like). For example, if queries are used with a conventional Elasticsearch database for a relationship traversal, the performance cost would be Om or m log n (where m is the degree of separation). Thus, as the degrees of separation increase, the performance cost quickly becomes punitive.

In some embodiments, system 126 is configured to modify a non-relational database to provide relational database functionality by creating graph data structures within the non-relational database which can be accessed using modified algorithms in addition to the non-relational (e.g. Elasticsearch) database commands.

In some embodiments, system 126 is configured to pre-build a graph data structure as elements are added to database 360. In this manner, the performance impact of constructing a graph data structure may be incurred early on, rather than incurring performance impacts during run-time. Further, as further described below, by pre-building a graph data structure, it may be possible to traverse through the graph data structure to find the start and end points of a search, and avoid having to query individual database elements and traverse through multiple searches (which is computationally inefficient). Thus, some embodiments described herein may provide significant improvements in performance, memory consumption, and efficiency for relational queries.

Moreover, an additional benefit associated with pre-building a graph data structure is that edges can be built between nodes that have partial and/or complex relationships. For example, the value of an example node (node A) may match a wildcard or regex expression at another node (node B), and this relationship can be represented by an edge. A practical example query might be to search for all servers that match an IP address (e.g., "10.40.*", where * represents a wildcard character that can have any value) in the network (and return all servers with IP addresses that begin with "10.40.", without limitation to the remaining two address bytes). Another practical example query might be a search for all applications owned by employees with the string "Director" somewhere in their job title (i.e. a substring of the employee's job title is 'Director', without being in a pre-determined location within the job title string). These types of queries are traditionally resource-intensive to perform, whereas in some embodiments described herein, the pre-building of the graph allows the performance impact to be frontloaded during graph build time, and therefore would not affect the final query time, according to some embodiments. Thus, some embodiments described herein may provide significant improvements in the run-time performance and computational efficiency of various types of queries.

Moreover, an additional benefit associated with some embodiments is that the additional functionality may be implemented at the code level alongside elasticsearch commands. In so doing, significant decreases in the amount of required storage are possible (relative to, for example, layering graphs on top of an elasticsearch database, which would require purchasing other graph-based products and making duplicate copies of the entire dataset in the database, which would essentially double the amount of storage required to implement).

In an example embodiment, different elements of a data set (e.g., data objects representing a company's infrastructure network) may be stored in one or more indeces in a database 360 (e.g. a non-relational database using the Elasticsearch service). In this example, a company's infrastructure assets may include routers, switches and server hosts, and example indeces might include a host index (which includes data elements for all hosts) and a network index (which includes data elements for all routers and switches). A host might be connected to a network through an IP address from the hose to the switch. Likewise, a port connection might except between a network interface and the MAC address. In some embodiments, one or more graph data structures may be constructed between elements of various indexes, or between elements of a single index, based on relations between those elements such as those noted above.

Continuing with the above-noted example, a graph structure might include nodes representing host elements and network elements, which may be connected by edges representing the relation between the nodes. For example, an IP address label might be used for an edge between a node representing a switch and a node representing a host, where the IP address represents the assignment of the IP address. Similarly, an edge could be created between a router and a server host using the IP address field as vertices on each end of the edge. Physical connections (such as a port connection between a network interface and MAC address) between devices might be represented through a separate graph data structure. As described, these example graph data structures may allow for efficient relational querying of the company's infrastructure network elements.

In some embodiments, all of these mappings may be stored in a single graph index file or document in database 360. In some embodiments, the graph index file may be referenced by system 126 so as to create a graph of edges and vertices/nodes. This graph may then be uploaded to database 360 and referenced when a relational query is generated for database 360. In some embodiments, the graph may be re-generated and updated. For example, such re-generation may occur on a daily basis (e.g., at the beginning of each day).

In some embodiments, the resulting database 360, which was previously optimized for non-relational, plain-text searches may support efficient graph-based relational querying of elements without the significant performance penalty noted above. Thus, the data elements in database 360 (e.g., documents stored primarily by hashing and plain-text indexing to facilitate text searching) may additionally support searching based on relational aspects between disparate data elements based on the graph generated from the graph index file.

In some embodiments, the graph index file may be used to generate a graph. In some embodiments, prior to generating the graph, a breadth-first search may be conducted on the graph index to confirm that values exist on the graph before generating edges. For each vertex of the graph and prospective edges connecting vertices, system 126 may traverse through the graph to determine if there is a value at the destination vertex. If a value exists at the destination, then system 126 adds an edge to the graph. System 126 may further provide a label for the vertex, create an edge to the parent, and generate an adjacency graph for that vertex.

In some embodiments, system 126 may include supplemental graph traversal functions which are not natively included or supported by the elasticsearch library. Such supplemental graph traversal functions may provide relational database functionality for system 126 and database 360. These graph traversal data processes are adapted to perform graph traversals, and/or other operations that interact with the structure of the generated graph.

In some embodiments, the supplemental graph traversal functions may include at least one of a "walk" function and an "enrich" function. In some embodiments, the walk function may receive as inputs a query and a destination node, and will return the document located at the destination node belonging to a related dataset as the output. For example, given three sets of data (e.g., servers, applications, and employees), a walk query with inputs specifying a list of servers, and the application owner (as the destination) will cause system 126 to traverse from the server dataset to the application dataset, and then the application owner/employee dataset. In some embodiments, the output of the query would be a list of employees representing the owners of the servers initially specified, based on the primary application the server is hosting.

In still other embodiments, the walk process proceeds by being given a list of edges to follow, a source node and destination node. In response to receiving a walk command, system 126 may start at the source node and traverse the graph data structure to the destination node, which will then return the destination document, following the edges passed. An example list of edges could be, in the example of a walk from a network dataset to a dataset of applications hosted on a network device, a network→server (by IP address) edge defined by the vertex or field name on each end of the edge, and then a server→application (by application name) edge. In some embodiments, if no edges are provided as an input for a walk command, Dijkstra's algorithm may be used to find the shortest list of edges to traverse from source to destination.

In some embodiments, the enrich function receives, as inputs, a query together with fields in a destination node, and returns the result of the query having fields in the destination node appended thereto. For example, if a query is for a list of servers, and the destination node is an application owner in an employee node, the enrich function will output a list of servers with each server containing an extra field relating to the application owner's email address.

In still other embodiments, a graph enrich process may perform a graph walk, but adds fields from the destination node to the source's node. In some embodiments, the enrich function functions by first executing a graph walk as described above, and then retrieving a list of specified destination fields provided with the input. This list of fields may then be added to the source node document and returned. The enrich functionality may be particularly useful in applications where the user wants to return a single document or data entry with all of the data enriched. An example could be a list of applications enriched with the application owner details, the related executive sponsor's details, as well as the related database custodian details.

Advantageously, in some embodiments, multiple walk and/or enrich function calls may be combined to form an "action chain" of operations on the graph. For example, a walk may be performed from Source A to Source B, and an enrich function may be called from source C onto source B using (A→C) as the edge relationship. This combination of commands may return the source B document with enrichment fields from the source C document. These use cases may be particularly useful in a situation where, for example, the user only knows a list of employees and wants to perform a search on applications that each of those employees owns. Using a walk function, system 126 can take the list of employees and generate a list of applications. If the user then wants to generate a report on applications these users own, as well as the servers on which such applications reside, the system can perform a walk from (employees→applications), and then enrich the application data with server data using the (application→server) relationship.

It will be appreciated that given a depth of m and a set of n source vertices, embodiments of the approach described herein can yield an operational efficiency of $O(m*n)$. Assuming that a search is, at minimum, $O(n)$, using traditional search functions would yield an efficiency of $O(n^m)$. Thus, this represents a technical improvement that may improve the overall functioning of a computer, as it practically reduces run-time processing costs. Accordingly, an operation of a lower magnitude in complexity could result in improved computing outcomes, require less computing hardware/software/resources, and/or allow computational processes to be executed within a desired timeframe, such as in real or near real-time.

In some embodiments, system 126 may be configured to provide a graphical user interface for allowing users to perform one or more of the above-noted relational and/or non-relational queries on one or more data sets implemented on one or more database shards.

Figure 5:
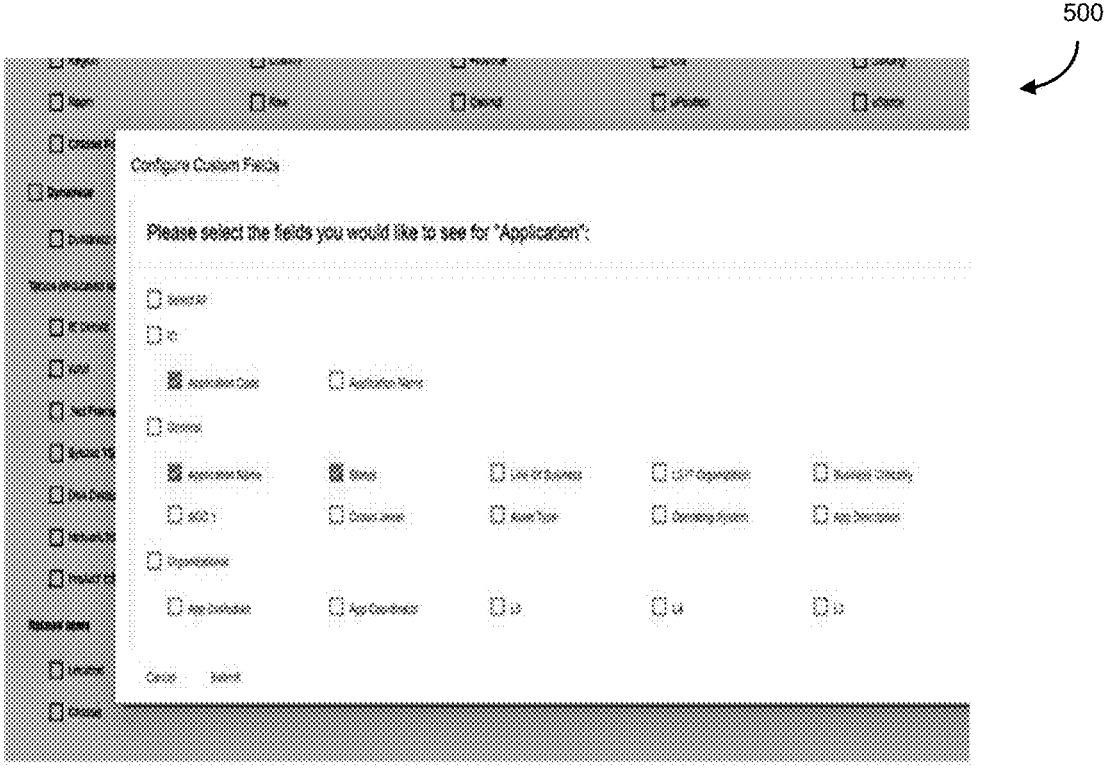
FIG. 5 depicts an example user interface configured to enable querying against or modifying data, in accordance with some embodiments.

FIG. 5 is an example of a user interface for querying against or modifying data, based on relations between elements. A user interface in some embodiments would allow for relational querying or updating. In the user interface shown in FIG. 5, the user interface is shown for a particular export example in which the system 126 is tasked with retrieving downstream related items. A number of custom fields are shown (e.g, application name, status, line of business, asset type, operating system, app description, and the like), and the user may select one or more fields (e.g., using an input device) to be rendered or displayed in a graphical user interface (as depicted, for example, in FIG. 6). In the example embodiment depicted in FIG. 5, when the user makes these selections through interactions with the GUI interface to indicate the fields to be shown, system 126 may then invoke a data process or function which is utilized for the retrieval of downstream related items.

During this retrieval process, the graph data structure on the backend may be utilized for a search against servers (which can be represented as nodal data objects) to support an "export using enrich" action to retrieve application data. In this context, the term "export" may refer to the generation of a data report in which the server node data is generated but is also "enriched" with the data that exists in the application dataset.

Figure 6:
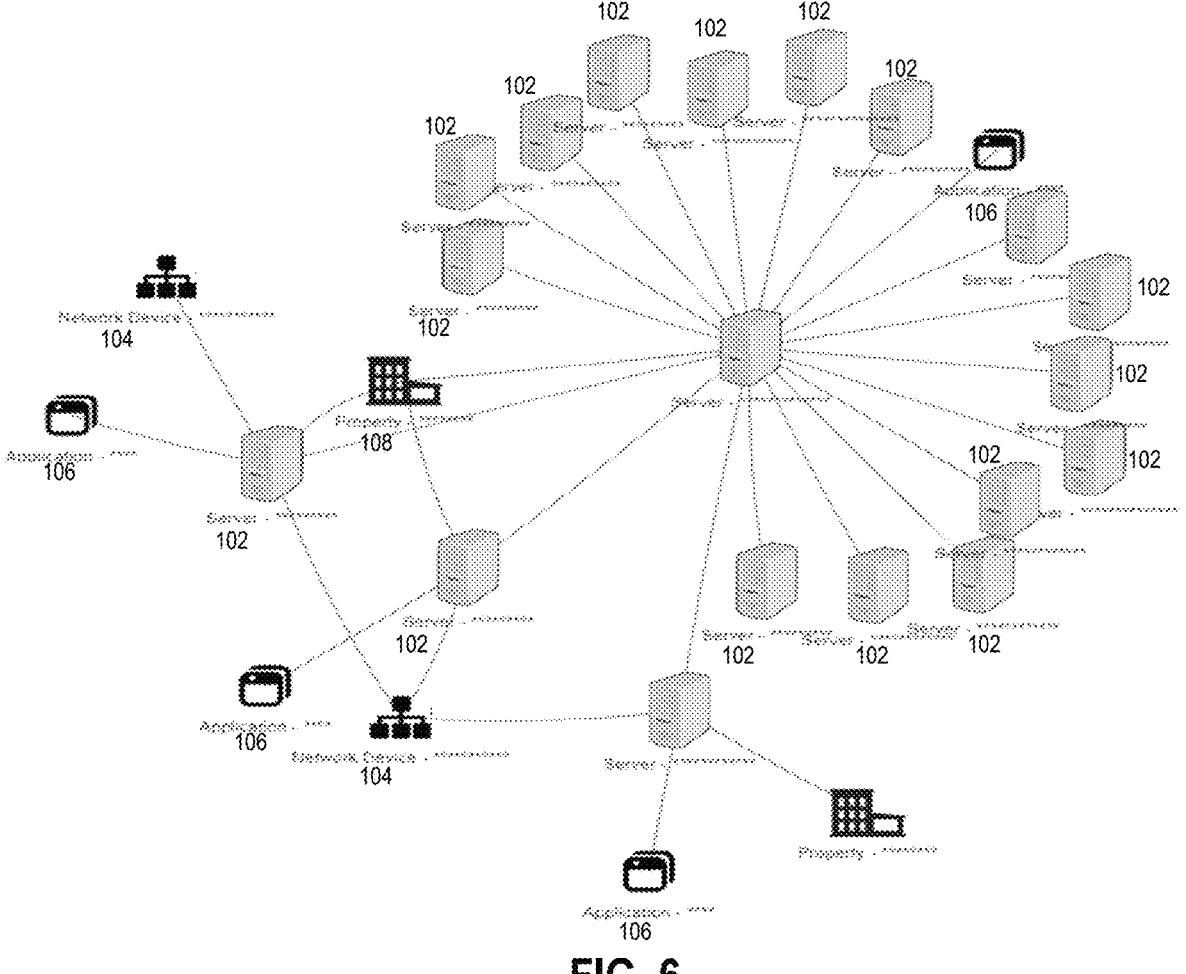
FIG. 6 is an example visualization of a graph data structure representing servers, applications and network devices, in accordance with some embodiments.

FIG. 6 depicts a rendering of a visualization of data generated by system 126. As depicted, a number of different computer devices 102 are shown having unique identifiers, which can be used as a proxy identifier for the computer devices in the form of a variable that may be used as a primary key reference. In FIG. 1, there are a number of connected servers 102, connected owners, and there may be downstream devices which are represented as applications 106, connected network devices 104, and the like.

FIG. 3 is a block diagram depicting components of an example data enrichment system 126, in accordance with some embodiments. As depicted in FIG. 3, system 126 is configured to interact with an elasticsearch database 360 to provide relational database functionality through the use of graph data structures. In some embodiments, elasticsearch database 360 may be a non-relational database storing hashed-based documents which are optimized for plain-text searching, which may be supplemented with additional indexing capabilities to enable efficient graph-based relational searching of elements. This may allow data objects (e.g. documents) stored primarily by hashing and plain-text indexing (in order to allow for efficient text searching) to be searched additionally based on relational aspects between documents, with these relational aspects stored based on relationships organized around graph edges.

As depicted, system 126 may include graph pre-build engine 302, which is configured to pre-build indices for later querying, and can be configured to conduct an asynchronous batch job for high throughput data insertion. In some embodiments, graph pre-build engine 302 may be configured to generate a graph index data structure representative of a data mapping of key edges between different vertices of a graph, wherein each vertex represents a key field within an index.

In some embodiments, graph pre-build engine 302 interoperates with graph data structure generator 304, which is a computational engine that is configured to generate a graph based on the graph index data structure. As contemplated herein, graph pre-build engine may be configured to update the graph index data, which in turn may be used by graph data structure generator 304 to generate an updated graph. Once generated, the graph can then be traversed or otherwise interacted with to provide additional data process functionality that extends the native functionality of the underlying elasticsearch database. In some embodiments, this functionality may include the walk and enrich functions described herein. In some embodiments, graph data structure generator 304 may be configured to generate a refreshed graph data structure periodically (e.g., on a daily basis, or any suitable interval based on the nature of the underlying data sets). The graph data structure can have various nodes and edges, and these can be computationally implemented using different types of computational objects, such as linked list nodal objects, among others, which store reference pointers that can represent various edges, alongside nodal or class specific variable data that can store information such as fields, weights, directionality of edges, among others.

In some embodiments, features of an elasticsearch data store can be used to help create efficient mappings. For example, when generating the edges of a graph, the edges may be defined using the _id fields of each vertex instead of the fieldname values which are used to derive the edge. This may allow for the traversal along the _id fields of the vertices using the _mget function in elasticsearch, rather than the baseline _search method (which is less efficient), thus resulting in a significant improvement in computational efficiency for some embodiments.

As depicted, system 126 further includes graph traversal engine 306. In some embodiments, graph traversal engine 306 is configured to respond to relational queries. In some embodiments, graph traversal engine may provide improved relational query response speed by traversing the interconnections of the graph data. A practical application graph traversal engine 306 is the facilitation of, for example, querying for all application data for a set of network devices.

In conventional Elasticsearch systems, there would be three disparate data sets (one representing each of network, servers, and applications, respectively). Using the functionality natively available in an elasticsearch system to perform the above-noted query would require searching for all network data documents and parsing each result for all servers hosted on the network device. Once all servers have been found, a similar query would need to be performed against the server dataset to find all applications on each server. Finally, a third query would need to be performed against all applications in order to get the filtered application datasets. It will be appreciated that in systems having databases implemented with shard architectures (e.g., different partitions of a database held on separate database servers, where each partition forms part of a shard, which may in turn be located on a separate database server or physical location), embodiments described herein may be particularly advantageous. For example, the performance gains achieved when all data is stored in a single data shard may not be as substantial as the performance gains achieved when a database is implemented across numerous shards.

Advantageously, using the graph approach, an initial network query may instead be made against the graph data structure, which holds the relationships and the IDs of the target destinations. System 126 may then uses these sets of IDs to traverse the graph, which is faster than searching based on arbitrary values that link these datasets. Once the search reaches the destination, the final list of IDs may be used to perform a "multi get" (or _mget) query in elasticsearch, which is more optimized than a search and a relationship between network and application.

As depicted, graph rendering engine 310 can be a graphical controller engine configured to generate visualizations or graphical control elements to visualize the graphs for provisioning to a user interface. Although depicted as forming part of a computing device located at the computing device of an end user, it will be appreciated that graph rendering engine 310 may be implemented locally within system 126.

In some embodiments, a graph traversal may be performed by graph traversal engine 306 by reading through the graph and picking up the identifier (or "_id") fields. Querying for these identifier fields using the _mget function in a datastore such as elasticsearch is typically faster than a _search query, and as a result, data lookups may be performed with O(1) efficiency. Thus, when bulk querying for large sets of documents, it may become possible to find all the documents within the graph, iterate through the graph to get the destination graph document's ID and follow this ID path to the next set of graphs.

This may enable graph walking algorithms to traverse through multiple layers in a single database lookup, resulting in improved O(1) computational complexity for each step of the query contained within an index. In a conventional approach using a standard non-relational database, a separate database lookup would be required to traverse through each layer, requiring at least O(n) time in terms of computational complexity. When the data process reaches the destination node, the data process takes the identifiers and their respective indices and query the destination documents.

In some embodiments, a walk function may accept as inputs: a downstream node, a series of edges (defined by the source field name and destination field name), and a source node. Using the source node, the walk function may look for the edge defined in the input and gather the _id field that was generated for that edge. The walk function may then perform an _mget call against the graph for the _id field. In some embodiments, this series of operations may result in O(1) processing efficiency for retrieval, because no search is being conducted. Searching using the _id field may also improve computation efficiency, as the _id field is specifically indexed in memory for retrieval. In addition, further computational efficiency may be achieved by gathering data from the graph, rather than from each source document (which is likely significantly larger).

In some embodiments, the walk function may recursively perform the above-noted steps to gather the next edge until the destination has been found. Once the destination has been found, a retrieval on the actual source document may be performed, rather than on the graph.

The graph traversal and retrieval of document methodology described may be further extended, in some embodiments, to provide for a variety of further aggregation and enrichment functionalities. In an example implementation, "enrich" functions may be performed on the graph data structure, where additional data is added to graph edges and nodes during a traversal through the relationship graph. This might be used, for example, to enrich data from an application repository, a network repository or an employee information repository.

FIG. 4 depicts an example process 400 for enriching a non-relational database, in accordance with some embodiments. At block 402, the computing device begins by instantiating a graph data structure having a plurality of interconnected nodes connected across at least one or more edge representations. In some embodiments, the graph data structure is instantiated prior to a start of a runtime duration. At block 404, the graph data structure is populated by conducting a mapping of a non-relational database to assign one or more database entries of the non-relational database to each node of the plurality of interconnected nodes, and the one or more weight representations is assigned a description value or field indicative of how the one or more database entries are connected with one another. At block 406, the graph data structure is uploaded into the non-relational database such that the graph data structure is utilized to process a relational query during runtime. At block 408, a relational query is received during runtime. At block 410, the relational query is processed by traversing the graph data structure. At block 412, a graphical user interface can also be controlled to render an output data object corresponding to the graph outputs for presentation to a user.

In some embodiments, system 126 may operate on physical or virtual computing hardware, and may be compatible with both physical databases, and databases running on virtual data stores.

Some embodiments of the systems and methods described herein may be configured to interoperate with middleware, which can take advantage of the plurality of data storage techniques offered to improve application speed. Developers may also be able to take advantage of the plurality of data storage techniques described herein, making the process of application development simpler.

Some embodiments of the systems described herein may be provided in the form of a computer program product, which can include software or firmware which can be provided or affixed in the form of machine interpretable instruction sets residing on non-transitory computer readable memory. These instructions, when executed by a processor, cause the processor to perform steps of the method. As noted above, the system can be implemented as a computer server or computer device appliance that is connected using middleware, for example, to a message bus at a data center, which is adapted as a data enrichment system that can interoperate with data from data sources, such as computational inventory data.

A practical use case for some embodiments of the systems and methods described herein can include enriching high volume alert data (which can be highly scaled at large volumes, such as thousands of alerts per hour). In particular, some embodiments described herein may provide an integrated mechanism for a technical solution whereby response times are fast enough to meet the underlying computational workflow time constraints of a computing system. In some embodiments, techniques described herein may be tuned based on the need to meet such workflow time constraints, providing improved search response times for responding to various computational queries. As noted herein, in various embodiments, computational capabilities are extended to work with relational data, using a specialized approach to additional build or otherwise establish graphs layered onto datasets to expose relational elements when responding to a particular query. A technical trade off is being made with respect to cost/storage efficiency, and this technical approach is useful in relation to balancing performance at the cost of memory consumption.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments described herein are intended to include within their scope such processes, machines, manufacture, compositions of matter, means, methods, or steps.

As can be understood, the examples described above and illustrated are intended to be exemplary only.

What is claimed is:

1. A computer implemented database system, the system comprising a computer processor configured to:

receive one or more data sets for storage in a non-relational database, each of said data sets being stored in said non-relational database as hash-based documents optimized for plain-text indexing, said non-relational database using one or more storage primitives of an elasticsearch library, said storage primitives including an _id field for each data object in said one or more data sets;

prior to the start of a runtime duration, generate, by a graph pre-build engine, a graph index data structure representative of a data mapping of key edges between different nodes of a graph, wherein each node represents a key field within an index, and wherein each edge comprises a description indicating how the one or more nodes are related;

store the graph index data structure in the non-relational database;

generate, by a graph data structure generator, a graph data structure based on said graph index data structure, wherein edges of said graph data structure are defined using said _id fields of each node;

receive a relational query for said non-relational database;

process, by a graph traversal engine, said relational query by traversing the id fields of said nodes of said graph data structure using an _mget function and without using a _search function; and return a result of said relational query.

2. The system of claim 1, wherein said processing said relational query includes at least one traversal of said graph data structure.

3. The system of claim 2, wherein the at least one traversal is initiated by traversing the graph data structure to identify a start node and a destination node.

4. The system of claim 1, wherein using the _mget function is executed with O(1) efficiency.

5. The system of claim 1, wherein the non-relational database is partitioned into a plurality of shards.

6. The system of claim 2, wherein the query is a bulk query, and processing said bulk query comprises identifying all documents of a set of documents in said graph data structure, walking through said graph data structure to extract an identifier from a document at a destination node, and following an identifier path to a subsequent set of graphs.

7. The system of claim 6, wherein said walking comprises traversing through multiple layers of data records of the non-relational database.

8. The system of claim 7, wherein said walking through the graph data structure is repeated until arriving at a destination node, and upon arriving at the destination node, extracting a set of identifiers and querying documents at said destination node.

9. The system of claim 1, wherein the system is a computing device residing on a computing appliance within a data center and coupled to a computer network bus middleware, providing relational search capabilities to queries for said data center.

10. A computer implemented method for improving performance of a database system, the method comprising:

receiving one or more data sets for storage in a non-relational database, each of said data sets being stored in said non-relational database as hash-based documents optimized for plain-text indexing, said non-relational database using one or more storage primitives of an elasticsearch library, said storage primitives including an id field for each data object in said one or more data sets;

prior to the start of a runtime duration, generating, by a graph pre-build engine, a graph index data structure representative of a data mapping of key edges between different nodes of a graph, wherein each node represents a key field within an index, and wherein each edge comprises a description indicating how the one or more nodes are related;

storing said graph index data structure in said non-relational database;

generate, by a graph data structure generator, a graph data structure based on said graph index data structure, wherein edges of said graph data structure are defined using said id fields of each node;

receiving a relational query for said non-relational database;

processing, by a graph traversal engine, said relational query by traversing the _id fields of said nodes of said graph data structure using an mget function and without using a search function; and returning a result of said relational query.

11. The method of claim 10, wherein said processing said relational query includes at least one traversal of said graph data structure.

12. The method of claim 11, wherein the at least one traversal is initiated by traversing the graph data structure to identify a start node and a destination node.

13. The method of claim 10, wherein using the _mget function is executed with O(1) efficiency.

14. The method of claim 10, wherein the non-relational database is portioned into a plurality of shards.

15. The method of claim 11, wherein the query is a bulk query, and processing said bulk query comprises identifying all documents of a set of documents in said graph data structure, iterating through the graph data structure to extract an identifier from a document at a destination node, and following an identifier path to a subsequent set of graphs.

16. The method of claim 15, wherein iterating through the graph data structure is repeated through multiple layers of data records of the non-relational database.

17. The method of claim 16, wherein the iterating through the graph data structure is repeated until arriving at a destination node, and upon arriving at the destination node, extracting a set of identifiers and querying documents at said destination node.

18. A non-transitory computer readable storage medium having stored thereon processor-executable instructions that, when executed by one or more processors, cause the one or more processors to perform a computer implemented method for improving performance of a database system, the method comprising:

receiving one or more data sets for storage in a non-relational database, each of said data sets being stored in said non-relational database as hash-based documents optimized for plain-text indexing, said non-relational database using one or more storage primitives of an elasticsearch library, said storage primitives including an id field for each data object in said one or more data sets;

prior to the start of a runtime duration, generating, by a graph pre-build engine, a graph index data structure representative of a data mapping of key edges between different nodes of a graph, wherein each node represents a key field within an index, and wherein each edge comprises a description indicating how the one or more nodes are related;

storing said graph index data structure in said non-relational database;

generating, by a graph data structure generator, a graph data structure based on said graph index data structure, wherein edges of said graph data structure are defined using said id fields of each node;

receiving a relational query for said non-relational database;

processing, by a graph traversal engine, said relational query by traversing the _id fields of said nodes of said graph data structure using an mget function and without using a search function; and returning a result of said relational query.

* * * * *